(12) United States Patent
Liang et al.

(10) Patent No.: US 9,594,401 B2
(45) Date of Patent: Mar. 14, 2017

(54) NOTEBOOK COMPUTER

(71) Applicant: Lenovo (Beijing) Co., Ltd., Beijing (CN)

(72) Inventors: Runsheng Liang, Beijing (CN); Ning Wang, Beijing (CN); Fenglang Li, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/752,049

(22) Filed: Jun. 26, 2015

(65) Prior Publication Data

US 2016/0224062 A1 Aug. 4, 2016

(30) Foreign Application Priority Data

Feb. 2, 2015 (CN) .......................... 2015 1 0053475

(51) Int. Cl.
*G06F 1/16* (2006.01)
(52) U.S. Cl.
CPC ................... *G06F 1/1618* (2013.01)
(58) Field of Classification Search
CPC combination set(s) only.
See application file for complete search history.

(56) References Cited

U.S. PATENT DOCUMENTS

| | | | | |
|---|---|---|---|---|
| 4,961,126 A * | 10/1990 | Suzuki | ............. | G06F 1/1616 16/223 |
| 5,283,862 A * | 2/1994 | Lund | ............. | G06F 1/162 345/173 |
| 5,295,089 A * | 3/1994 | Ambasz | ............. | G06F 1/1628 348/791 |
| 7,398,114 B2 * | 7/2008 | Gartrell | ............. | H01H 13/702 361/814 |
| 8,125,759 B2 * | 2/2012 | Fukuma | ............. | F16G 13/18 248/349.1 |
| 8,194,399 B2 * | 6/2012 | Ashcraft | ............. | G06F 1/1626 257/59 |
| 8,749,960 B2 * | 6/2014 | Mori | ............. | H05K 5/0086 248/346.03 |
| 8,842,423 B2 * | 9/2014 | Griffin | ............. | G06F 1/1626 248/919 |
| 8,929,085 B2 * | 1/2015 | Franklin | ............. | G06F 1/1626 361/749 |
| 8,947,868 B2 * | 2/2015 | Motoishi | ............. | G06F 1/1613 361/679.21 |
| 8,958,201 B2 * | 2/2015 | Leung | ............. | G06F 1/1626 361/679.27 |
| 8,988,876 B2 * | 3/2015 | Corbin | ............. | A45C 13/002 361/679.58 |
| 9,013,884 B2 * | 4/2015 | Fukuma | ............. | G06F 1/1652 361/749 |
| 9,250,733 B2 * | 2/2016 | Lee | ............. | H04M 1/02 |

* cited by examiner

*Primary Examiner* — Lisa Lea Edmonds
(74) *Attorney, Agent, or Firm* — Brinks Gilson & Lione; G. Peter Nichols

(57) ABSTRACT

A notebook computer includes a first housing layer, a frame member layer, and a second housing layer. The first housing layer and the second housing layer encloses the frame member layer, the frame member layer is located within an interior enclosing space defined by the first housing layer and the second housing layer. The first and second housing layers are capable of moving along with movement of the frame member layer and form an overall appearance with two hierarchies of the notebook computer.

13 Claims, 3 Drawing Sheets

NOTEBOOK COMPUTER

This application claims priority to Chinese Patent Application No. 201510053475.1 filed on Feb. 2, 2015; the entire contents of which are incorporated herein by reference.

The present application relates to the field of electronic product technique, and more particularly, to a notebook computer.

BACKGROUND

A notebook computer comprises a display portion, a keyboard portion, and a rotary connecting portion, wherein the display portion comprises a first housing and a second housing that define an interior enclosing space in which a display screen and other members are mounted; the keyboard portion comprises a third housing and a fourth housing that define an interior enclosing space in which input members like a keyboard and a touch panel etc. are mounted. In the prior art, it is prevalent for the notebook computer to assemble the first housing, the second housing, the third housing, and the fourth housing as separate members, that is, during the assembly, first, the first housing, the second housing, and the display screen and other members are enclosed to define the display portion, the third housing, the fourth housing, the keyboard, and other input members are enclosed to define the keyboard portion; then the display portion that has been assembled and the keyboard portion that has been assembled are connected together through the rotary connecting member, thus consisting an overall appearance of the notebook computer. Appearance shape of such notebook computer formed by the four-housing assembly manner is dull and user experience is poor.

SUMMARY

According to embodiments of the present application, a notebook computer is provided, the notebook computer includes: a first housing layer; a frame member layer; and a second housing layer. The first housing layer and the second housing layer encloses the frame member layer, the frame member layer is located within an interior enclosing space defined by the first housing layer and the second housing layer. The first and second housing layers are capable of moving along with movement of the frame member layer and form an overall appearance with two hierarchies of the notebook computer.

In an embodiment of the present application, the frame member layer includes: a first frame; a rotary connecting member; and a second frame rotatably connected to the first frame through the rotary connecting member. The first frame is operable to move relative to the second frame through the rotary connecting member upon an external force; the first and second housing layers are capable of moving together along with movement of the first frame relative to the second frame, and maintaining the overall appearance with two hierarchies of the notebook computer.

In an embodiment of the present application, when the external force is withdrawn, the rotary connecting member is configured to provide support force to maintain an end state of the movement of the first frame relative to the second frame, the first housing layer and the second housing layer maintain the overall appearance with two hierarchies of the notebook computer in the end state of the movement of the first frame relative to the second frame.

In an embodiment of the present application, the frame member layer includes: M first members fixed within the first frame and containing a display output member with a display output area; M is a positive integer more than or equal to 1; and N second members fixed within the second frame and containing an input member with an input area; N is a positive integer more than or equal to 1.

In an embodiment of the present application, the first housing layer includes: a first window corresponding to the display output area of the display output member; and a second window corresponding to the input area of the input member. The first window and the second window are located in different areas on the first housing layer; the display output area of the display output member located within the interior enclosing space is exposed through the first window of the first housing layer, the input area of the input member located within the interior enclosing space is exposed through the second window of the first housing layer.

In an embodiment of the present application, when the external force is withdrawn, the rotary connecting member is configured to provide support force to maintain an end state of the movement of the first frame relative to the second frame, the first frame is in a first relative position relative to the second frame through the rotary connecting member, the first window of the first housing layer corresponding to the first frame and the second window of the first housing layer corresponding to the second frame face each other.

In an embodiment of the present application, when the external force is withdrawn, the rotary connecting member is configured to provide support force to maintain an end state of the movement of the first frame relative to the second frame, the first frame is in a second relative position relative to the second frame through the rotary connecting member, the first window of the first housing layer and the second window of the first housing layer have a predetermined angle therein between.

In an embodiment of the present application, when the external force is withdrawn, the rotary connecting member is configured to provide support force to maintain an end state of the movement of the first frame relative to the second frame, the first frame is in a third relative position relative to the second frame through the rotary connecting member, a portion provided on the second housing layer corresponding to the first frame and a portion provided on the second housing layer corresponding to the second frame face each other.

In an embodiment of the present application, each of the first and second housing layers is integrally-molded one-piece housing.

In an embodiment of the present application, a first portion provided on the first housing layer corresponding to the rotary connecting member is made from flexible material; and a second portion provided on the second housing layer corresponding to the rotary connecting member is made from flexible material.

In an embodiment of the present application, the first portion provided on the first housing layer is a curved recess formed inwardly by an outer surface of a first housing on the first housing layer.

In an embodiment of the present application, when the external force is withdrawn, the rotary connecting member is configured to provide support force to maintain an end state of the movement of the first frame relative to the second frame, the first frame is in a first relative position relative to the second frame through the rotary connecting member, a first window of the first housing layer corresponding to the first frame and a second window of the first housing layer corresponding to the second frame face each other, the first portion defined by the curved recess is configured to maintain bending curvature consistent with the second portion provided on the second housing layer.

In an embodiment of the present application, the first portion of the first housing layer has a first area with a third window, and/or the second portion of the second housing layer has a second area with a fourth window. The first area of the first portion is corresponding to the second area of the second portion.

In an embodiment of the present application, the rotary connecting member located within the interior enclosing space is exposed through the third window of the first housing layer; and/or the rotary connecting member located within the interior enclosing space is exposed through the fourth window of the second housing layer.

DETAILED DESCRIPTION

To further illustrate the technical measures adopted by the present application to achieve the intended objects and the technical effects thereof, hereinafter, modes, structures, features, and effects according to the specific embodiments of the present application will be described in detail below. In the following description, different "an embodiment" or "embodiment" may not necessarily refer to the same embodiment. In addition, specific features, structures, or characteristics in one or more embodiments may be combined in any suitable forms.

Figure 1:
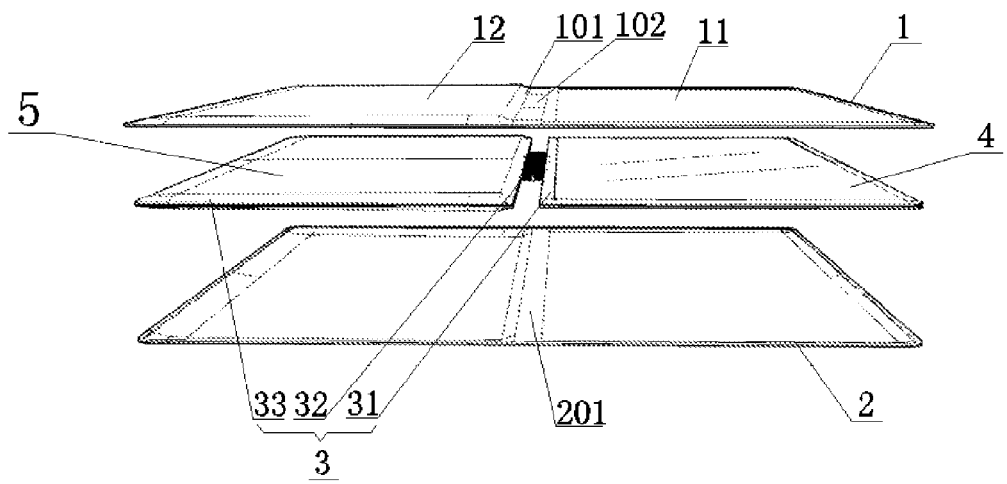
FIG. 1 is an exploded schematic diagram of structure of a notebook computer provided by an embodiment of the present application.
Figure 2:
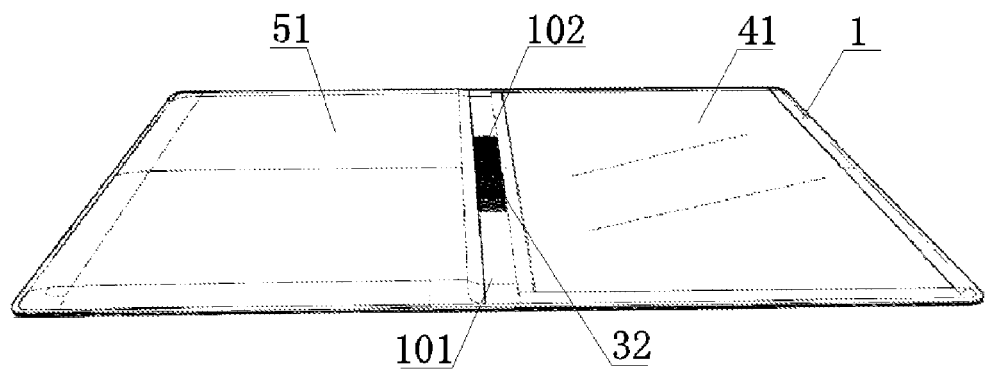
FIG. 2 is a schematic diagram of structure of a notebook computer provided by an embodiment of the present application when being opened with an angle of 180 degrees after being assembled.

As shown in FIG. 1, an embodiment of the present application provides a notebook computer, comprising: a first housing layer 1, a frame member layer 3, and a second housing layer 2. As shown in FIG. 2, the first housing layer 1 and the second housing layer 2 enclose the frame member layer 3, the frame member layer 3 is located within an interior enclosing space defined by the first housing layer 1 and the second housing layer 2, in other words, the first housing layer 1 and the second housing layer 2 are assembled together and form an enclosing space in the interior, the frame member layer 3 is provided within the interior enclosing space. The first housing layer 1 and the second housing layer 2 can provide effective support and protection for the frame member layer 3 located within the interior enclosing space. The first housing layer 1 that has been enclosed and the second housing layer 2 that has been enclosed form an overall appearance with two hierarchies of the notebook computer, in other words, viewing from the appearance, the notebook computer of the present application in entirety have only two hierarchies of the first housing layer 1 and the second housing layer 2, its appearance surface is more simplified, in comparison to the four-hierarchy housing structure in the prior art.

During an implementation in particular, as shown in FIG. 1, the frame member layer 3 mentioned above comprises: a first frame 31, a rotary connecting member 32, and a second frame 33. The second frame 33 is rotatably connected to the first frame 31 through the rotary connecting member 32 so that an angle between the first frame 31 and the second frame 33 are adjustable. The first frame 31 moves relative to the second frame 33 through the rotary connecting member 32 upon an external force; the first housing layer 1 that has been enclosed and the second housing layer 2 that has been enclosed may move together along with the first frame 31 and the second frame 33, i.e., the first housing layer 1 that has been enclosed and the second housing layer 2 that has been enclosed may also folded together with them, and during the movement of the first housing layer 1 that has been enclosed and the second housing layer 2 that has been enclosed, the first housing layer 1 that has been enclosed and the second housing layer 2 that has been enclosed can always maintain an overall appearance with two hierarchies of the notebook computer. In other words, when the first frame 31 and the second frame 33 drive the first housing layer 1 that has been enclosed and the second housing layer 2 that has been enclosed to move together, the notebook computer of the present application may be in various states like closed, presented, standing, flat, tablet etc., during a process of switching between the aforesaid various states, the first housing layer 1 that has been enclosed and the second housing layer 2 that has been enclosed always maintain an overall appearance with two hierarchies of the notebook computer.

The technical solutions provided by the embodiments of the present application simplify the conventional four-housing appearance architecture of notebook computer as two-housing appearance architecture, so that appearance of the notebook computer of the present invention achieves more simplicity, a completely new appearance architecture shape is provided, thus types of appearance shape of notebook computer are enriched, more selections are provided for the user, and using experience of the user is improved.

In the above embodiment, during an assembly in particular, it is possible to assemble in three layers, for instance, first, the second housing layer 2 may be placed on a working platform; then the first frame 31 and the second frame 33 of the frame member layer 3 are connected together through the rotary connecting member 32, and mounted on the second housing layer 2; thereafter assemble other related members of the frame member layer 3 into the first frame 31 and the second frame 33, respectively; and last, cap-cover the first housing layer 1 on the second housing layer 2, and enclose the frame member layer 3. Of course, in other embodiments, the notebook computer in the above embodiment may adopt other assembly manner, so long as it is ensured that the first housing layer that has been enclosed and the second housing layer that has been enclosed enclose the frame member layer within the interior enclosing space, and the overall appearance with two hierarchies of the notebook computer can be always maintained when the first housing layer that has been enclosed and the second housing layer that has been enclosed are folded arbitrarily.

Based on the above description, the first frame 31 moves relative to the second frame 33 through the rotary connecting member 32 upon an external force, the first frame 31 and the second frame 33 drive the first housing layer 1 that has been enclosed and the second housing layer 2 that has been enclosed to move together along with them, the first housing layer 1 that has been enclosed and the second housing layer 2 that has been enclosed can always maintain an overall appearance with two hierarchies of the notebook computer during the movement. Likewise, when the external force mentioned above is withdrawn, the rotary connecting member 32 may provide support force to maintain an end state of the movement of the first frame 31 relative to the second frame 33. In other words, after the first frame 31 and the second frame 33 are rotated and set an angle, like closed, presented, standing, flat, tablet etc., upon an external force, when the external force is withdrawn, the first frame 31 and the second frame 33 can maintain stable in the current state. As shown in FIGS. 2 to 5, the first housing layer 1 that has been enclosed and the second housing layer 2 that has been enclosed in common maintain the overall appearance with two hierarchies of the notebook computer in the end state of the movement of the first frame relative to the second frame. Accordingly, no matter during the movement of folding of the first housing layer 1 and the second housing layer 2, or the still stable state of the first housing layer 1 and the second housing layer 2 after the movement, an overall appearance with two hierarchies of the notebook computer can be always maintained, so that the overall appearance of the notebook computer of the present application can keep coherence, and does not change along with the folding of the notebook computer, thus achieving better stability.

Based on the above description, during an implementation in particular, the frame member layer 3 mentioned above may further comprise M first members and N second members. As shown in FIGS. 1 and 2, in this embodiment, the M first members are fixed within the first frame 31 and contain a display output member 4 with a display output area 41, such as a display screen, M is a positive integer more than or equal to 1. The N second members are fixed within the second frame 33 and contain an input member 5 with an input area 51, such as a keyboard, a touch panel, or a language input member etc., N is a positive integer more than or equal to 1. In this embodiment, the display output member 4 is mounted in the first frame 31, the input member 5 is mounted in the second frame 33, the two are mounted in two different frames separately, which facilitates assembly; and when one of them, such as the display output member 4 or the input member 5 is broken, it only needs to make repair or replacement on the corresponding frame, without affecting the member on the other frame, which facilitates repair.

It should be added that, the first frame 31 and the second frame 33 mentioned above may be two independent frames respectively, members in the display portion of the notebook computer, such as display screen etc., are all mounted on the first frame 31, members in the keyboard portion of the notebook computer, such as motherboard, touch panel etc., are all mounted on the second frame 33. Of course, in an alternative embodiment, the first frame 31 is a member having larger area in members of the display portion of the notebook computer, for instance, the first frame 31 is the display screen, and other members in the display portion are all mounted on the display screen. Also, the second frame 33 may be a member with larger area among members of the keyboard portion of the notebook computer, for instance, the second frame 33 may be the motherboard, and other members in the keyboard portion are all mounted on the motherboard. Specific implementations may be set according to actual needs of the user; no more concrete definitions are made herein.

Based on the above description, during an implementation in particular, as shown in FIGS. 1 and 2, the first housing layer mentioned above comprises a first window 11 corresponding to the display output area 41 of the display output member 4, and a second window 12 corresponding to the input area 51 of the input member 5. The first window 11 and the second window 12 are located in different areas on the first housing layer 1. The display output member 4 located within the interior enclosing space exposes the display output area 41 through the first window 11 of the first housing layer 1 that has been enclosed, the input member 5 located within the interior enclosing space exposes the input area 51 through the second window 12 of the first housing layer 1 that has been enclosed. In other words, the display output member 4 mentioned above is mounted in the first frame 31, the display output area 41 of the display output member 4 is exposed through the first window 11 on the first housing layer 1 that has been enclosed; the input member 5 mentioned above is mounted in the second frame 33, the input area 51 of the input member 5 is exposed through the second window 12 on the first housing layer 1 that has been enclosed. In this embodiment, the display output 41 and the input area 51 are exposed through two windows (the first window 11 and the second window 12) on the first housing layer 1, respectively, this conforms to daily operation practices of the user, and it is more humane.

Figure 3:
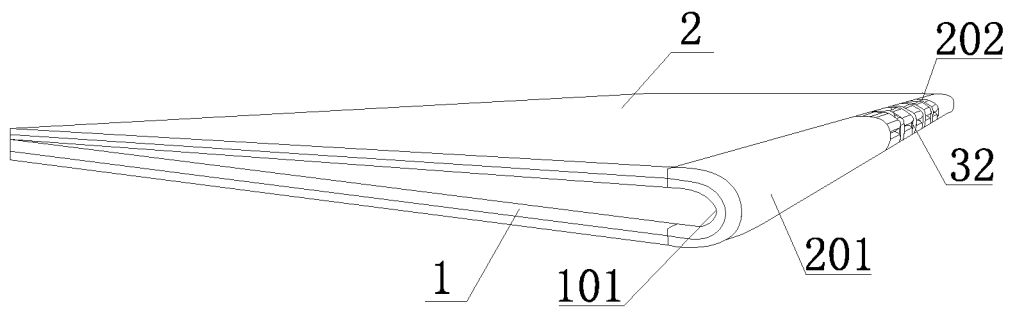
FIG. 3 is a schematic diagram of structure of a notebook computer provided by an embodiment of the present application when being closed with an angle of 0 degrees after being assembled.
Figure 4:
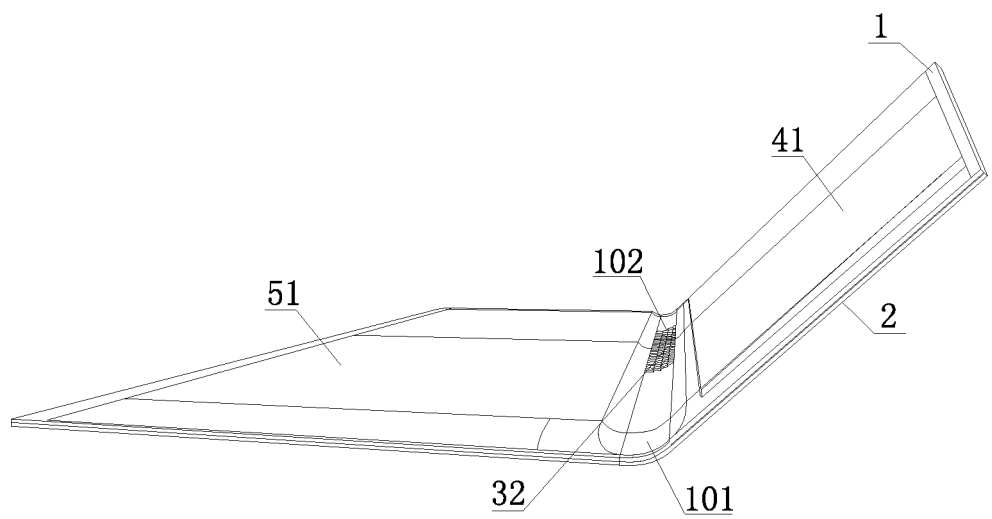
FIG. 4 is a schematic diagram of structure of a notebook computer provided by an embodiment of the present application when being opened with an angle of 130 degrees after being assembled.
Figure 5:
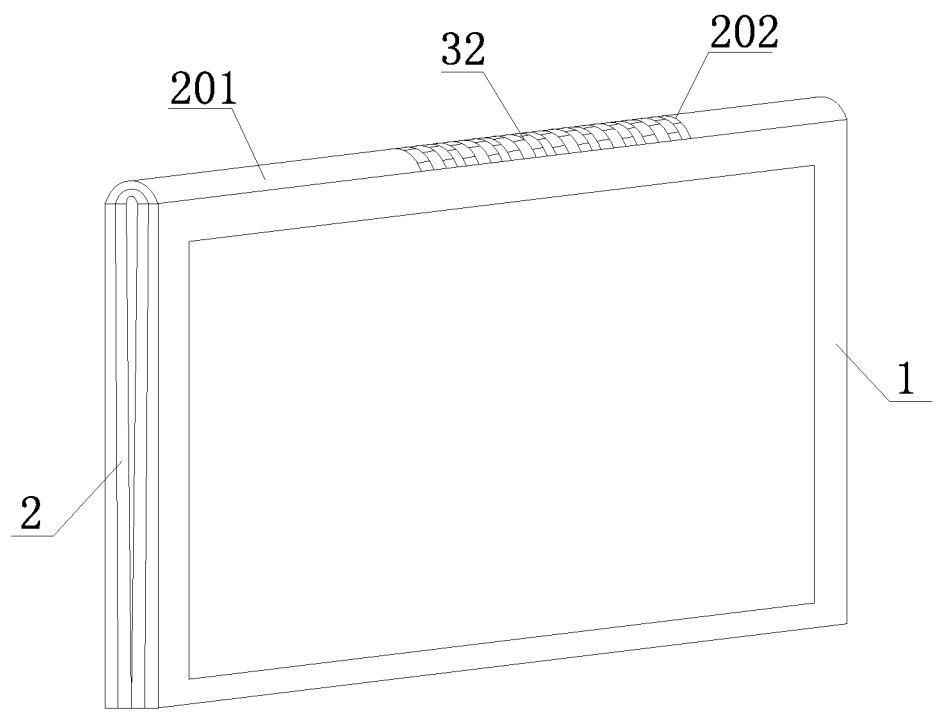
FIG. 5 is a schematic diagram of structure of a notebook computer provided by an embodiment of the present application when being opened with an angle of 360 degrees after being assembled.

Based on the above description, during an implementation in particular, when the external force is withdrawn, the rotary connecting member 32 may provide support force to maintain an end state of the movement of the first frame 31 relative to the second frame 33, for instance, the rotary connecting member 32 may be a damping shat etc., the first frame 31 may be folded relative to the second frame 33 through the rotary connecting member 32, and first frame 31 and the second frame 33 may maintain a relative stability between the two of them at the position after being folded. The first frame 31 may be in a different relative position relative to the second frame 33 through the rotary connecting member 32, for instance, in the first example, as shown in FIG. 3, when the first frame 31 is in a first relative position relative to the second frame 33 through the rotary connecting member 32, the first window 11 of the first housing layer 1 and the second window 12 of the first housing layer 1 face each other, "face" here refers to that the first window 11 and the second window 12 of the first housing layer 1 are set face to face, so that the display output area 41 and the input area 51 mentioned above also face to each other, in other words, the notebook computer in this case is in a closed state. In a second example, as shown in FIGS. 2 and 4, when the first frame 31 is in a second relative position relative to the second frame 33 through the rotary connecting member 32, the first window 11 of the first housing layer 1 and the second window 2 of the second housing layer 2 have a predetermined angle therein between. In the second relative position, the first window 11 of the first housing layer 1 is folded with respect to the second window 12 and there is a predetermined angle therein between, for instance, there may be an angle of 90 degrees to 180 degrees, the notebook computer in this case is opened and in a normal using mode, presenting mode, or standing mode etc. In a third example, as shown in FIG. 5, when the first frame 31 is in a third relative position relative to the second frame 33 through the rotary connecting member 32, a portion provided on the second housing layer 2 and corresponding to the first frame 31 and a portion provided on the second housing layer 2 and corresponding to the second frame 33 are against each other. The first frame 31 in this case rotates 360 degrees relative to the second frame 33, so that the portion provided on the second housing layer 2 and corresponding to the first frame 31 and the portion provided on the second housing layer 2 and corresponding to the second frame 33 are folded. The notebook computer in this case may be in a tablet mode, i.e., the notebook computer in this case may be used as a tablet computer.

Herein, it should be added that, when the external force is withdrawn, the first frame 31 may be in the first or second or third relative position only relative to the second frame 33 through the rotary connecting member 32, or may be in any two relative positions among the above three relative positions only, or it is possible to switch arbitrarily among the above three relative positions, no more concrete definitions are made here, it is possible to set according to actual needs of the user.

During an implementation in particular, in order to make the notebook computer mentioned above capable of showing an overall appearance with two hierarchies, the first housing layer 1 mentioned above may be integrally-molded one-piece housing, the second housing layer mentioned above may be integrally-molded one-piece housing. Since the first housing layer 1 and the second housing layer 2 both are integrally-molded one-piece housing, a continuous appearance surface may be presented on a single housing, in this way, the two can show an obvious two-hierarchy in entirety; in addition, since they are one-piece, there is better intensity between the first housing layer 1 and the second housing layer 2, the structure is more stable.

Based on the above description, in order to make the first housing layer 1 and the second housing layer 2 mentioned above capable of being folded together along with the first frame 31 and the second frame 33, in the embodiment of the present application, a first portion 101 provided on the first housing layer 1 and corresponding to the rotary connecting member 32 may be made from flexible material, a second portion 201 provided on the second housing layer 2 and corresponding to the rotary connecting member 32 may be made from flexible material. The flexible material here may be flexible rubber or flexible silicon gel etc., it is possible to set in particular according to actual needs of the user.

Generally, according to nature and composition, silica gel may be divided into two categories of organic silica gel and inorganic silica gel. Inorganic silica gel is a highly active adsorption material, usually obtained by reacting sodium silicate and sulfuric acid, and then going through a series of post-processing of aging, acid soak. Silica gel is amorphous material, its chemical formula is $mSiO_2 \cdot nH_2O$. It is insoluble in water and any solvent, non-toxic, odorless, chemically stable, it does not react with any substance except corrosive alkali, hydrofluoric acid. Various types of silica gel form different pore structures because of their different manufacturing methods. Chemical composition and physical structure of silica gel determine that it has many characteristics that cannot be replaced by many other allied materials: high adsorption, better thermal stability, high chemical stability, high mechanical strength. Organic silica gel is an organic silicon compound, means a compound having a Si—C bond, and having at least one organic group directly connected to silicon atom, in practice, compound that makes the organic group like oxygen, sulfur, nitrogen etc. connected with the silicon atom is also regarded as an organic silicon compound. Among them, polysiloxane composed with silicon-oxygen bond (—Si—O—Si—) as skeleton is a classification that has the largest number, has been studied the deepest and applied most widely among organic silicon compounds, accounting for approximately more than 90% of a total amount of usage.

Rubber is water-impermeable, air-impermeable material having elasticity and insulation, made by processing latex taken from rubber tree rubber, rubber grass and other plants. Rubber is divided into two categories of natural rubber and synthetic rubber. Natural rubber is obtained by processing gum extracted from rubber tree, rubber grass and other plants; synthetic rubber is obtained by that monomers go through polymerization.

The flexible rubber or flexible silicon gel have better flexibility, they can deform after being subjected to an external force and automatically restore after the external force is removed.

Here, it should be added that, in an example of the above embodiment, it is possible that only the first portion 101 provided on the first housing layer 1 mentioned above and corresponding to the rotary connecting member 32 is made from flexible material, the rest portions on the first housing layer 1 may be made from hard material; likewise, it is possible that only the second portion 201 provided on the second housing layer 2 mentioned above and corresponding to the rotary connecting member 32 is made from flexible material, the rest portions on the second housing layer 2 may be made from hard material. The first portion 101 made from flexible material may be molded on the portions of hard material on the first housing layer 1 in an injection manner, the first portion 201 made from flexible material may be molded on the portions of hard material on the second housing layer 2 in an injection manner. Since the portions other than the first portion 101 on the first housing layer 1 are all made from hard material, so that the first housing layer 1 has better intensity. Also, since the portions other than the second portion 201 on the second housing layer 2 are all made from hard material, so that the second housing layer 2 has better intensity. In another example of the above embodiment, the first housing layer 1 and the second housing layer 2 made from flexible material in entirety are covered on the first frame 31 and the second frame 33, the two of which may have the function of providing support and stability for the first housing layer 1 and the second housing layer 2.

Based on the above description, further, as shown in FIGS. 1, 2, and 4, the first portion 101 provided on the first housing layer 1 mentioned above may be a curved recess formed inwardly by an outer surface of the first housing. The "inwardly" here refers to directing to the side of the interior enclosing space, wherein the first portion 101 recesses inwardly with regard to the first housing layer 1 and forms a curved recess structure, which bring the technical effect of guiding the notebook computer to fold.

Further, as shown in FIG. 3, when the external force is withdrawn, the rotary connecting member 32 provides support force to maintain an end state of the movement of the first frame 31 relative to the second frame 33, the first frame 31 is in a first relative position relative to the second frame 33 through the rotary connecting member 32, the first window 11 of the first housing layer 1 and the second window 12 of the first housing layer 1 face each other, in this case, the first frame 31 and the second frame 33 have an angle of zero degrees therein between, the notebook computer in the present application is a closed state. In this closed stated, the first portion 101 defined by the curved recess is configured to maintain bending curvature consistent with the second portion 201 provided on the second housing layer, so that the notebook computer of the present application is more beautiful in shape. During an implementation in particular, the first portion 101 and the second portion 201 may be bonded together through glue, so that the two can be folded together as an entirety.

Based on the above description, as shown in FIGS. 1, 2, and 4, during an implementation in particular, a first area of the first portion 101 provided on the first housing layer 1 may have a third window 102, the rotary connecting member 32 located within the interior enclosing space is exposed through the third window 102 of the first housing layer 1 that has been enclosed, which brings the following technical effects: since the first area of the first portion 101 provided on the first housing layer 1 has a third window 102, the first housing layer 1 uses less material, cost is reduced; in addition, the rotary connecting member 32 is exposed through the third window 102, so that the notebook computer in this embodiment have more beauty mechanically; the rotary connecting member 32 is exposed through the third window 102, which reduces friction that the rotary connecting member 32 has with the first portion 101 during rotation, which results in less wear.

Here it should be added that, as shown in FIGS. 3 and 5, a second area of the second portion 201 provided on the second housing layer 2 mentioned above has a fourth window 202, the second area correspond to the first area of the first portion 101 of the first housing layer 1 that has been enclosed. The rotary connecting member 32 located within the interior enclosing space mentioned above is exposed through the fourth window 202 of the second housing layer 2 that has been enclosed. In this case, the rotary connecting member 32 is exposed through the third window 102 and the fourth window 202 concurrently, which extremely reduces friction that the rotary connecting member 32 has with the first portion 101 and the second portion 201 during rotation, and thereby further reduces wear, so that the rotary connecting member 32 has a longer life.

During an implementation in particular, the rotary connecting member 32 mentioned above may be implemented through a damping shaft or a flexible member with damping etc., its specific structure is common technique in the prior art, and may be selected from the prior art as needed, no more details repeated here.

According to the above embodiments, the notebook computer of the present application at least has the following advantageous effects:

By means of providing the first housing layer 1 and the second housing layer 2, the technical solutions provided by the embodiments of the present application form an overall appearance with two hierarchies of the notebook computer through and the first housing layer 1 that has been enclosed and the second housing layer 2 that has been enclosed, and when the first frame 31 and the second frame 33 located within the interior enclosing space defined by the first housing layer 1 and the second housing layer 2 move relatively, the first housing layer 1 and the second housing layer 2 can move together along with them and maintain the aforesaid overall appearance with two hierarchies, that is, the overall appearance with two hierarchies can be always maintained, regardless of the state of the notebook computer (closed, presented, standing, flat, tablet etc.). The technical solutions provided by the embodiments of the present application simplify the conventional four-housing appearance architecture of notebook computer as two-housing appearance architecture, so that appearance of the notebook computer of the present invention achieves more simplicity, a completely new appearance architecture shape is provided, thus types of appearance shape of notebook computer are enriched, more selections are provided for the user, and using experience of the user is improved.

The above described are merely preferred embodiments of the present application, not limitations to the present application in any form, any simple modification, equivalent change or modification and so on made to the above embodiments based on the technical essence of the present application all fall into the scope of the technical solutions of the present application.

The invention claimed is:

1. A notebook computer comprising:
   a first housing layer;
   a frame member layer; and
   a second housing layer;
   wherein the first housing layer and the second housing layer enclose the frame member layer, the frame member layer being located within an interior enclosing space defined by the first housing layer and the second housing layer; the first and second housing layers being capable of moving along with movement of the frame member layer and forming an overall appearance with two hierarchies of the notebook computer, and wherein the frame member comprises:
   a first frame;
   a rotary connecting member; and
   a second frame rotatably connected to the first frame through the rotary connecting member;
   the first frame configured to move relative to the second frame through the rotary connecting member upon an external force; the first and second housing layers configured to move together along with movement of the first frame relative to the second frame, and maintaining the overall appearance with two hierarchies of the notebook computer.

2. The notebook computer as claimed in claim 1, wherein when the external force is withdrawn, the rotary connecting member is configured to provide support force to maintain an end state of the movement of the first frame relative to the second frame, the first housing layer and the second housing layer maintain the overall appearance with two hierarchies of the notebook computer in the end state of the movement of the first frame relative to the second frame.

3. The notebook computer as claimed in claim 2, wherein the frame member layer further comprises:
   M first members fixed within the first frame and containing a display output member with a display output area; M being a positive integer more than or equal to 1; and
   N second members fixed within the second frame and containing an input member with an input area; N being a positive integer more than or equal to 1.

4. The notebook computer as claimed in claim 3, wherein the first housing layer comprises:
   a first window corresponding to the display output area of the display output member; and
   a second window corresponding to the input area of the input member;
   the first window and the second window are located in different areas on the first housing layer;
   the display output area of the display output member located within the interior enclosing space is exposed through the first window of the first housing layer;
   the input area of the input member located within the interior enclosing space is exposed through the second window of the first housing layer.

5. The notebook computer as claimed in claim 4, wherein when the external force is withdrawn, the rotary connecting member is configured to provide support force to maintain an end state of the movement of the first frame relative to the second frame, the first frame is in a first relative position relative to the second frame through the rotary connecting member, the first window of the first housing layer and the second window of the first housing layer face each other.

6. The notebook computer as claimed in claim 4, wherein when the external force is withdrawn, the rotary connecting member is configured to provide support force to maintain an end state of the movement of the first frame relative to the second frame, the first frame is in a second relative position relative to the second frame through the rotary connecting member, the first window of the first housing layer and the second window of the first housing layer have a predetermined angle therein between.

7. The notebook computer as claimed in claim 4, wherein when the external force is withdrawn, the rotary connecting member is configured to provide support force to maintain an end state of the movement of the first frame relative to the second frame, the first frame is in a third relative position relative to the second frame through the rotary connecting member, a portion provided on the second housing layer corresponding to the first frame and a portion provided on the second housing layer corresponding to the second frame are against each other.

8. The notebook computer as claimed claim 1, wherein the first housing layer is integrally-molded one-piece housing; and the second housing layer is integrally-molded one-piece housing.

9. The notebook computer as claimed in claim 8, wherein a first portion provided on the first housing layer corresponding to the rotary connecting member is made from flexible material and a second portion provided on the second housing layer corresponding to the rotary connecting member is made from flexible material.

10. The notebook computer as claimed in claim 9, wherein the first portion provided on the first housing layer is a curved recess formed inwardly by an outer surface of a first housing on the first housing layer.

11. The notebook computer as claimed in claim 10, wherein when the external force is withdrawn, the rotary connecting member is configured to provide support force to maintain an end state of the movement of the first frame relative to the second frame, the first frame is in a first relative position relative to the second frame through the rotary connecting member, a first window of the first housing layer corresponding to the first frame and a second window of the first housing layer corresponding to the second frame face each other, the first portion defined by the curved recess is configured to maintain bending curvature consistent with the second portion provided on the second housing layer.

12. The notebook computer as claimed in claim 11, wherein:
   the first portion of the first housing layer comprises a first area with a third window; and/or
   the second portion of the second housing layer comprises a second area with a fourth window;
   the first area of the first portion is corresponding to the second area of the second portion.

13. The notebook computer as claimed in claim 12, wherein:
   the rotary connecting member located within the interior enclosing space is exposed through the third window of the first housing layer; and/or
   the rotary connecting member located within the interior enclosing space is exposed through the fourth window of the second housing layer.

* * * * *